US006389087B1

United States Patent
Heinonen et al.

(10) Patent No.: US 6,389,087 B1
(45) Date of Patent: May 14, 2002

(54) APPARATUS AND METHOD FOR SYNCHRONIZATION IN A MULTIPLE-CARRIER COMMUNICATION SYSTEM BY OBSERVING ENERGY WITHIN A GUARD BAND

(75) Inventors: Jari M. Heinonen, Seattle; Michael R. Hirano, Redmond, both of WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/593,449

(22) Filed: Jun. 14, 2000

Related U.S. Application Data
(60) Provisional application No. 60/140,465, filed on Jun. 23, 1999.

(51) Int. Cl.[7] .......................... H04L 7/00; H04L 27/26; H04J 3/06
(52) U.S. Cl. ...................... 375/354; 375/260; 370/350; 370/503
(58) Field of Search ................................ 375/354, 260, 375/130, 147, 136, 224, 316, 326, 344, 377, 367; 370/203, 204, 208, 503, 509, 516, 319, 344

(56) References Cited

U.S. PATENT DOCUMENTS

| | | | | |
|---|---|---|---|---|
| 4,637,017 A | * | 1/1987 | Assal et al. ................. | 370/318 |
| 5,351,235 A | | 9/1994 | Lahtinen | |
| 5,596,582 A | | 1/1997 | Sato et al. .................. | 370/509 |
| 5,774,450 A | | 6/1998 | Harada et al. .............. | 370/206 |
| 5,799,000 A | | 8/1998 | Hoole | |
| 5,991,289 A | * | 11/1999 | Huang et al. ............... | 370/350 |
| 6,134,283 A | * | 10/2000 | Sands et al. ................ | 375/354 |

FOREIGN PATENT DOCUMENTS

| | | |
|---|---|---|
| EP | 0453203 A2 | 4/1991 |
| EP | 0998085 A1 | 5/1998 |
| EP | 0869648 A2 | 10/1998 |
| WO | WO 98/19410 | 5/1998 |

OTHER PUBLICATIONS

PCT, International Search Report for PCT/US 00/40230, Mailed Oct. 20, 2000, (5 pgs.).

Kim, Dong–Kyu, et al., "Performance Evaluation of the Frequency Detectors for Orthogonal Frequency Division Multiplexing"IEEE Transactions of Consumer Electronics, Aug. 1997, vol. 43, No. 3, pp. 776–782, Publisher unknown.

Patent Abstracts of Japan, "Automatic Frequency Control System", Pub. No. 10209999, Jul. 8, 1998.

Patent Abstracts of Japan, "Digital Broadcasting Receiver", Pub. No. 09224015, Aug. 26, 1997.

Zaman, S.U., et al., "Use of the DFT for Synchronization in Packetized Data Communications", IEEE, Apr. 19, 1994, Publisher unknown.

Yooh, J.H., et al., "On Synchronizing and Detecting Multi–carrier CDMA Signals", IEEE, Nov. 6, 1995, Publisher unknown.

(List continued on next page.)

Primary Examiner—Betsy L. Deppe
(74) Attorney, Agent, or Firm—Gray Cary Ware & Freidenrich

(57) ABSTRACT

A method, apparatus and system detects a loss of synchronization between a transmitter and a receiver in a multiple-carrier communication system such as an OFDM system. A guard band synchronization detector provides a synchronization indicator based on the energy detected within a guard band where a pilot tone is transmitted adjacent to the guard band. A timing error results in energy leakage into one or more guard bands. In one embodiment, a plurality of synchronization indicators are observed to determine whether a loss of synchronization between a transmitter and a receiver in the wireless system has occurred.

22 Claims, 8 Drawing Sheets

OTHER PUBLICATIONS

Lawrey, Eric, OFDM Results, http://www.eng.jcu.edu.au/eric/thesis/Thesis, http://www.eng.jcu.edu.au/eric/thesis/chapter1.htm (Sep. 24, 1999), http://www.eng.jcu.edu.au/eric/thesis/chapter2.htm and http://www.eng.jcu.edu.au/eric/thesis/appendix.htm, Nov. 5, 1999 (56 pgs).

Speth, Michael, OFDM Receivers for Broadband–Transmission, OFMD, http://www.ert.rwth–aachen.de/Projekke/Theo/OFDM/www_ofdm.html . . . node1.html through node9.html, Nov. 8, 1999 (15 pgs).

Speth, Michael, et al., "Broadband Transmission Using ODM: System Performance and Receiver Complexity", (7 pgs) (date unknown).

* cited by examiner

US 6,389,087 B1

APPARATUS AND METHOD FOR SYNCHRONIZATION IN A MULTIPLE-CARRIER COMMUNICATION SYSTEM BY OBSERVING ENERGY WITHIN A GUARD BAND

RELATED PATENT APPLICATIONS

This patent application claims the benefit of U.S. Provisional Application No. 60/140,465, filed on Jun. 23, 1999 and entitled "An OFDM Frequency Synchronization Lock Detection Method."

This patent application is related to U.S. patent applications entitled "Apparatus and Method for Synchronization in a Multiple-Carrier Communication System By Observing A Plurality of Synchronization Indicators", Ser. No. 09/593, 215, "Apparatus and Method for Synchronization in a Multiple-Carrier Communication System By Observing Phase-Frequency Relationship of a Plurality of Pilot Signals", Ser. No. 09/593,547, "Methods and Apparatus for Use in Obtaining Frequency Synchronization in an OFDM Communication System (1)", Ser. No. 09/594,866, "Methods and Apparatus for Use in Obtaining Frequency Synchronization in an OFDM Communication System (2)", Ser. No. 19/594,890; all filed concurrently with this application, and PCT Application entitled "Apparatus and Method for Synchronizing a Multiple-Carrier Communication System By Observing Energy Within A Guard Band", International Application No. PCT/US00/40230, filed Jun. 15, 2000. All related patent applications are incorporated by reference herein.

BACKGROUND OF THE INVENTION

The invention relates in general to communication systems and more specifically to synchronization in a multiple-carrier communication system.

Due to advantages over other modulation techniques, communication systems utilizing multiple-carrier signals are currently being implemented for a variety of applications. Communications systems using Orthogonal Frequency Division Multiplexing (OFDM) techniques are gaining acceptance for applications such as broadcast television, mobile wireless and fixed wireless, including wireless local loop (WLL) applications. OFDM modulation techniques provide high data rate transmission over hostile channels with a system having a relatively low complexity. A typical wireless transmission channel subjects a transmitted signal to multi-path dispersion, resulting in numerous versions of the signal arriving at the receiver at different times. The transmitted signal is reflected and refracted through multiple transmission paths having different characteristics. The resulting interference between the versions of the signal causes inter-symbol interference (ISI) of the transmitted data. OFDM techniques typically employ a guard time between symbols to reduce ISI. Also, since OFDM utilizes multiple-carrier signals transmitted through the transmission channel, frequency-selective fading impacts a smaller portion of the transmitted data than is the case with single-carrier systems. OFDM techniques simplify the complexity of multiple-carrier receivers by using a rectangular-shaped sub-carrier for generating the multiple-carrier signals.

The performance in an OFDM system, however, is highly correlated to the synchronization between the transmitter and receiver. Small errors in frequency or timing can greatly reduce the performance of the system. Many conventional synchronization techniques are limited in that the received data must be demodulated and analyzed in order to correct for synchronization errors and as a result require significant overhead of time and processing power.

SUMMARY OF THE INVENTION

In an exemplary embodiment of the invention, a loss of synchronization between a receiver and a transmitter is detected by observing energy of a pilot signal within a guard frequency band. At least two pilot signals are transmitted adjacent to a guard band where one pilot is transmitted immediately below a guard band and another is transmitted immediately above another guard band. Deviations in synchronization between the transmitter and the receiver result in at least some of the energy of one of the pilot signals being received within one of the guard bands. By observing the energy within the guard bands, a loss of synchronization between the receiver and the transmitter can be detected. Resources reserved for synchronization are employed to regain synchronization after a loss of synchronization is detected.

In the exemplary embodiment, the determination that a loss of synchronization has occurred is based on three parameters. A phase detector is used to determine phase error or frequency error between successive waveforms. A relationship between the frequency and the phase of a plurality of pilot signals is examined to determine if the waveform timing error exceeds a timing error threshold a number of times within a given time interval. The ratio of the guard band energy determines a frequency error. If two or more of the synchronization monitoring methods indicate a loss of synchronization, a receiver is determined to have lost synchronization with the transmitter.

DETAILED DESCRIPTION OF THE PREFERRED EMBODIMENTS

Figure 1:
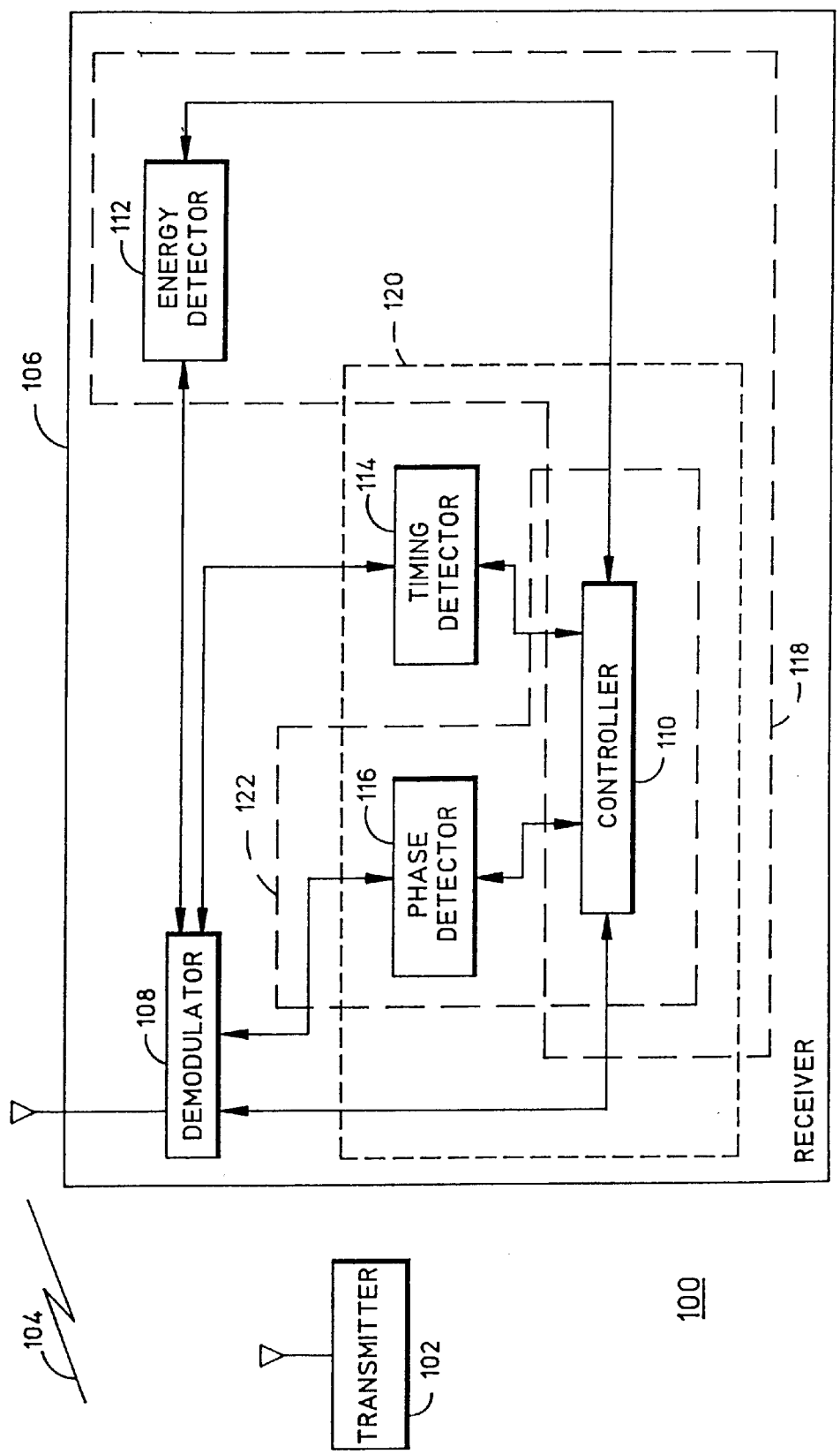
FIG. 1 is block diagram of a communication system in accordance with an exemplary embodiment of the invention.

FIG. 1 is a block diagram of a communication system 100 in accordance with the exemplary embodiment of the invention. In the exemplary embodiment, the communication system 100 is a fixed wireless communication system providing communication services to a subscriber premise. A transmitter 102 transmits signals in accordance with Orthogonal Frequency Division Multiplexing (OFDM) techniques to a receiver 106 through a wireless channel 104. Those skilled in the art will recognize the various other types of communication techniques and systems that can be utilized in accordance with the present invention. Further, in the interest of brevity, one-way communication is discussed and those skilled in the art will readily apply the techniques disclosed herein to either downstream or upstream communication and to systems utilizing one-way or two-way communication links.

In addition to other circuitry known in the art, the receiver 106 includes at least a demodulator 108, a controller 110 and an energy detector 112. In the exemplary embodiment, the receiver 106 also includes at least a timing detector 114 and a phase detector 116. Although the receiver 106 components are represented by individual functional blocks, those skilled in the art will recognize that the structure of the receiver 106 may be implemented with a variety of devices, circuits and integrated circuits. Further, circuits and other functional elements may be distributed over more than one functional block denoted in FIG. 1. For example, the energy detector 112 and the demodulator 108 may access the same Digital Signal Processing (DSP) circuitry in order to perform their respective functions. Also, a phase detector and phase locked loop (PLL) can be used to measure the phase differential magnitude between pilots within different time slots as well as to provide phase information used to determine the phase-frequency relationship of pilot signals transmitted within the same time slot.

The controller 110 is any type of computer, microprocessor, processor, processor arrangement, or combination of processors that facilitates the overall functionality of the receiver 106 in addition to performing the functions described herein. In the exemplary embodiment, the controller 110 is adapted to run lines of code that direct the receiver 106 in receiving and demodulating the signals transmitted from the transmitter 102, including execution of the loss of synchronization detection and synchronization processes.

In the exemplary embodiment, the demodulator 108 includes radio frequency (RF) circuitry and analog-to-digital (A/D) conversion circuitry in addition to digital signal processing (DSP) circuitry for demodulating the OFDM signals. The demodulator 108 may be implemented using a digital circuit, such as an Application Specific Integrated Circuit (ASIC), that performs a Fast Fourier Transform (FFT) on the digitized time series and a DSP processor that performs arithmetical operations on the FFT output. The FFT output is an array of complex values often referred to as tones, which consist of in-phase (I) and quadrature (Q) components.

The phase detector 116, energy detector 112 and timing detector 114, in conjunction with the controller 110, form a plurality of synchronization detectors 118, 120, 122 in the exemplary embodiment. Each of the synchronization detectors (118, 120, 122) produces a synchronization indicator in accordance with the parameters measured by the particular synchronization detector (118, 120, 122).

An energy detector 112 and controller 110 form an energy guard band synchronization detector 118 that provides a guard band energy synchronization indicator based on the energy measured within a guard band.

A phase-frequency slope synchronization detector 120 formed by the timing detector 114, phase detector 116, and the controller 110 provides a phase-frequency synchronization indicator based on the phase-to-frequency relationship of a plurality of received pilot signals where the pilot signals are transmitted at different frequencies. The phase offset of each received pilot signal is different for each pilot signal if the receiver 106 is not synchronized to the transmitter 102. As explained further below, the system 100 attempts to adjust the timing of the receiver 106 when a timing error is detected. In the exemplary embodiment, if the number of timing adjustments within a given time period exceeds a timing adjustment occurrence threshold (occurrence threshold), the timing error synchronization indicator indicates that a loss of synchronization has occurred.

The phase detector 116 and the controller 110 form a phase differential magnitude synchronization detector (phase magnitude synchronization detector) 122 that provides a phase differential magnitude synchronization indicator (phase magnitude synchronization indicator) based on the magnitude of the phase of a received pilot signal for different time slots. The phase differential magnitude synchronization detector 122, therefore, tracks the phase of pilot signals over time and indicates an error when the magnitude exceeds a phase threshold. Those skilled in the art will recognize that such a phase differential magnitude synchronization detector is subject to aliasing error if the frequency error exceeds one-half of the inverse of the time interval between timeslots.

The energy detector 112 measures energy within a given frequency spectrum dictated by the controller 110 and may be implemented in a variety of ways. In the exemplary embodiment, the energy detector 112 is implemented in the DSP processor in accordance with known techniques. The energy detector 112 sums the squares of the I and Q components of the signals contained within the frequency bandwidth associated with each guard band to determine the energy contained within the guard band. The guard band energy synchronization detector 118 formed by the energy detector 112 and the controller 110 indicates a frequency error when energy within the guard bands is detected. As discussed below in reference to FIG. 6, when the receiver 106 and the transmitter 102 are synchronized, the pilot signals are within the transmission band. When a frequency error occurs, one of the pilot signals will be received within one of the guard bands, and the pilot signal energy leaking into the guard band will cause the output of the energy detector 112 to increase. The resulting guard band energy synchronization indicator produced by the guard band energy synchronization detector 118 indicates that a loss of synchronization has occurred when energy within the guard band measured by the energy detector 112 is higher than an energy threshold. In the exemplary embodiment, a ratio of the energies within two guard bands is compared to a threshold.

The timing detector 114 indicates a time rate of change of a waveform timing error resulting from an offset between a received pilot signal waveform and a receive window. The receive window is dictated by a sampling clock derived from the oscillator (not shown) on the receiver 106. When the sampling clock is not perfectly synchronized to the waveform timing, the timing error results as is discussed below in reference to FIG. 3. The phase of each received pilot signal is directly proportional to the timing error and the frequency of the particular pilot signal. Therefore, for any given timing offset, the phase offset will increase as the frequency of the pilot signal is increased. By transmitting several pilot signals having different frequencies, a linear plot of a phase versus frequency can be used to represent the phase-frequency relationship as discussed below in reference to FIG. 4. An example of a suitable implementation and method is discussed in U.S. Pat. No. 5,799,000 entitled "Delay Compensation" issued Aug. 25, 1998 by Elliot Hoole. The receiver 106 receives uniformly spaced pilot signals through the demodulator 108. The pilot signals are digitized, sampled, passed through a Fast Fourier Transform (FFT) processor and stored in the FFT incremental frequency bins as complex numbers. The phase for each pilot signal is computed from each pilot complex value in the DSP processor using methods consistent with known techniques. Since the pilot phase dependence on pilot frequency is linear, the linear relationship may be calculated from measured data using well-known curve fitting techniques and linear regression algorithms.

The phase differential magnitude indicator produced by the phase differential magnitude detector 122 indicates the phase difference of a pilot signal received in successive time intervals. The phase detector 116 may be implemented using any one of several techniques, including using a phase detector device and PLL to provide a phase error signal having a magnitude based on the change in phase of the received signal. In the exemplary embodiment, the phase detector device and PLL are implemented in the DSP processor and are used to compute a low-pass filtered value of the phase differential. The measured phase value for a current time slot is compared to phase values measured for a previous time slot to determine the phase differential magnitude that indicates whether the system is out of synchronization.

By observing the three indicators, the controller 110 can accurately detect a loss of synchronization resulting in the implementation of a synchronization process that corrects for timing and frequency errors between the receiver 106 and transmitter 102. Any one of several synchronization procedures can be used to synchronize the receiver to the transmitter 102 in response to the detection of a loss of synchronization. An example of a suitable synchronization method and apparatus is discussed in co-pending U.S. patent application Ser. No. 09/594,866 filed on Jun. 14, 2000 and entitled "Methods And Apparatus For Use In Obtaining Frequency Synchronization In An OFDM Communication System".

Figure 2:
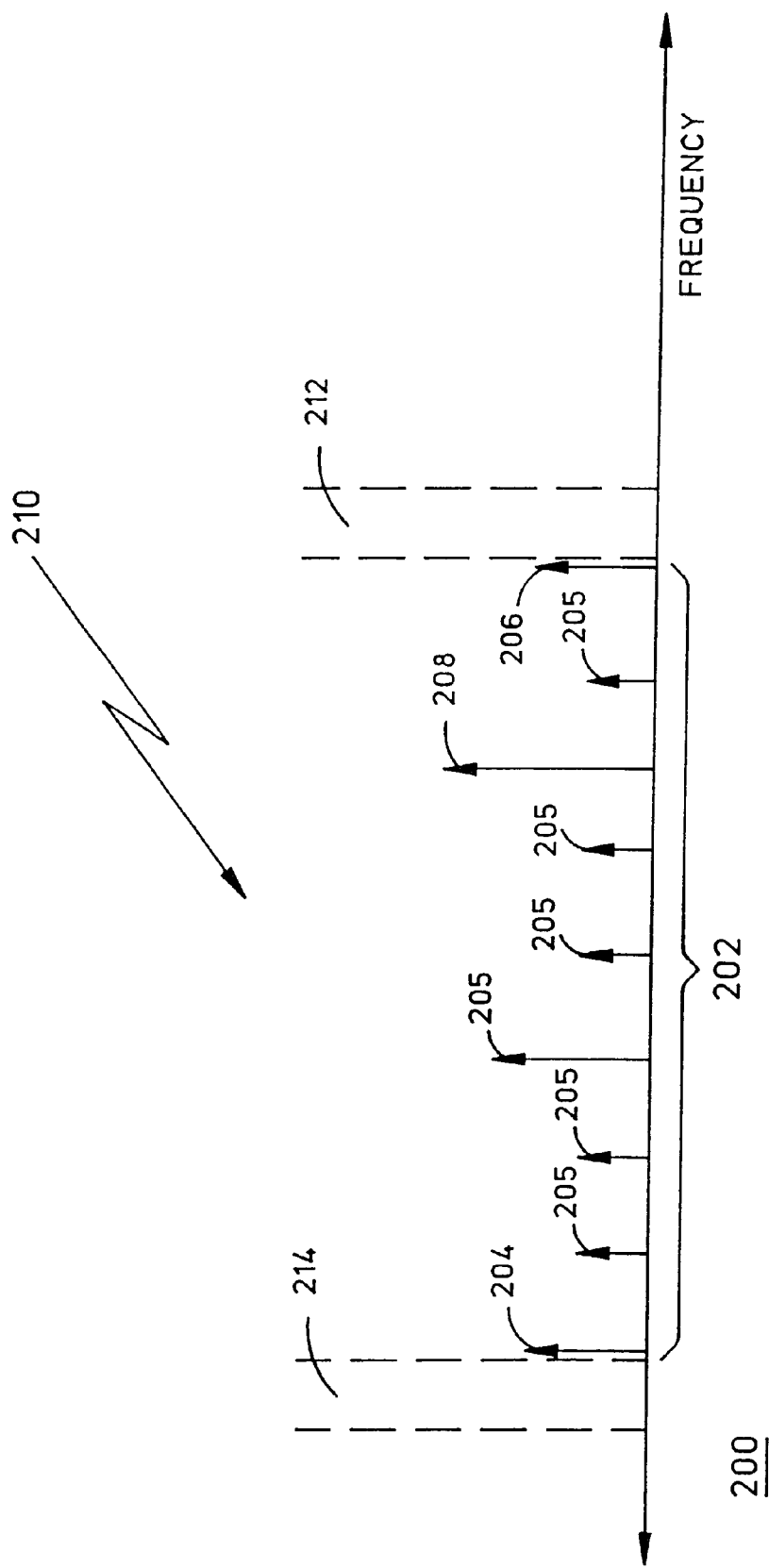
FIG. 2 is a graphical representation of a frequency spectrum including transmitted signals in a synchronous state in accordance with the present invention.

FIG. 2 is a graphical representation of a frequency spectrum 200 including transmitted signals 202 in accordance with the present invention. In the exemplary embodiment, the plurality of transmitted signals 202 are transmitted within a transmission band 210 and include at least a lower pilot signal 204, an upper pilot signal 206, and at least one data signal 208. In the exemplary embodiment, eight pilot signals 204, 205, 206 are transmitted in addition to a plurality of data signals 208. The transmission band 210 is bounded by an upper guard band 212 and a lower guard band 214 in which no signals are intentionally transmitted. The lower pilot signal 204 is transmitted immediately above and adjacent to the lower guard band 214 while the upper pilot signal 206 is transmitted immediately below and adjacent to the upper guard band 212. In other embodiments, the transmitted signals 202 may include additional pilot signals 205. Each of the transmitted signals 202 is an orthogonal narrow band carrier and is transmitted using known techniques.

Figure 3:
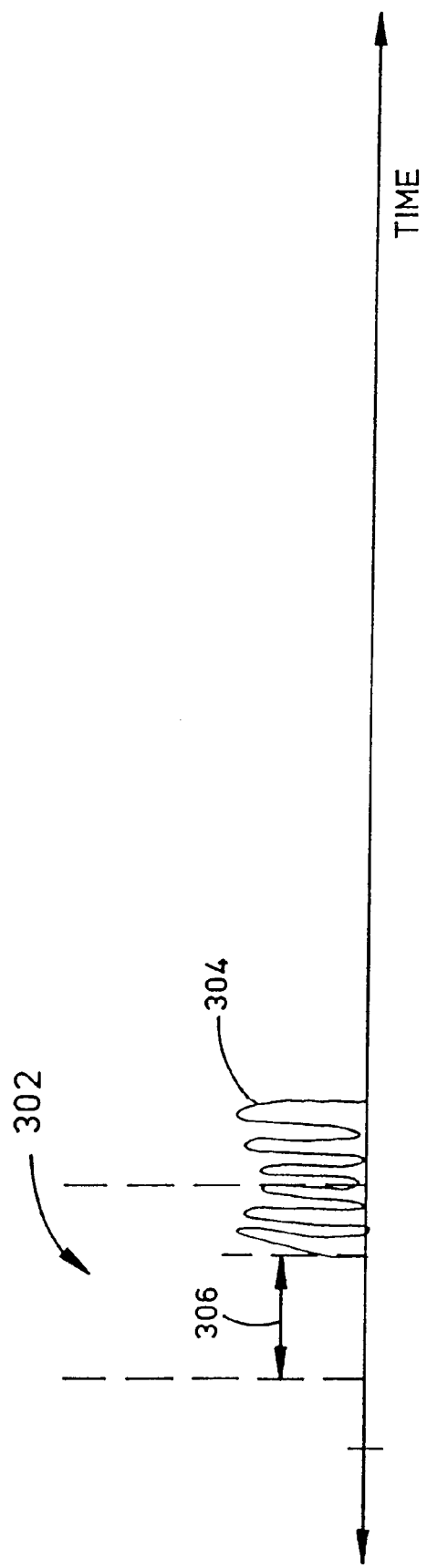
FIG. 3 is a graphical representation illustrating the timing error between a waveform and the sampling clock at the receiver.

FIG. 3 is a graphical representation illustrating the timing error 306 between a waveform 304 and the sampling clock at the receiver 106. When the receiver clock differs from the transmitted signal frequency, the timing error 306 occurs in the time domain as shown in FIG. 3. The time error is manifested as a linear relationship between the pilot frequencies and pilot signal phases. Since the time error is directly related to the slope of the phase ramp of FIG. 4, a horizontal phase ramp corresponds to zero time error; and a phase ramp with nonzero slope is directly proportional to the time error. In the exemplary embodiment, this slope is continually monitored by the DSP processor which readjusts the receiver time window 302 to obtain a zero slope phase ramp whenever the phase ramp slope exceeds a threshold. Excessive adjustment of the receiver time window 302 within a specified period of time indicates a loss of frequency lock. Another example of a method of observing the phase-frequency relationship of the received pilot signals includes determining that a loss of synchronization has occurred if the ratio of the phase to frequency exceeds a threshold. Excessive adjustment of the receiver time window 302 within a specified period of time indicates a loss of frequency lock. Another example of a method of observing the phase-frequency relationship of the received pilot signals includes determining that a loss of synchronization has occurred if a threshold is exceeded.

Figure 4:
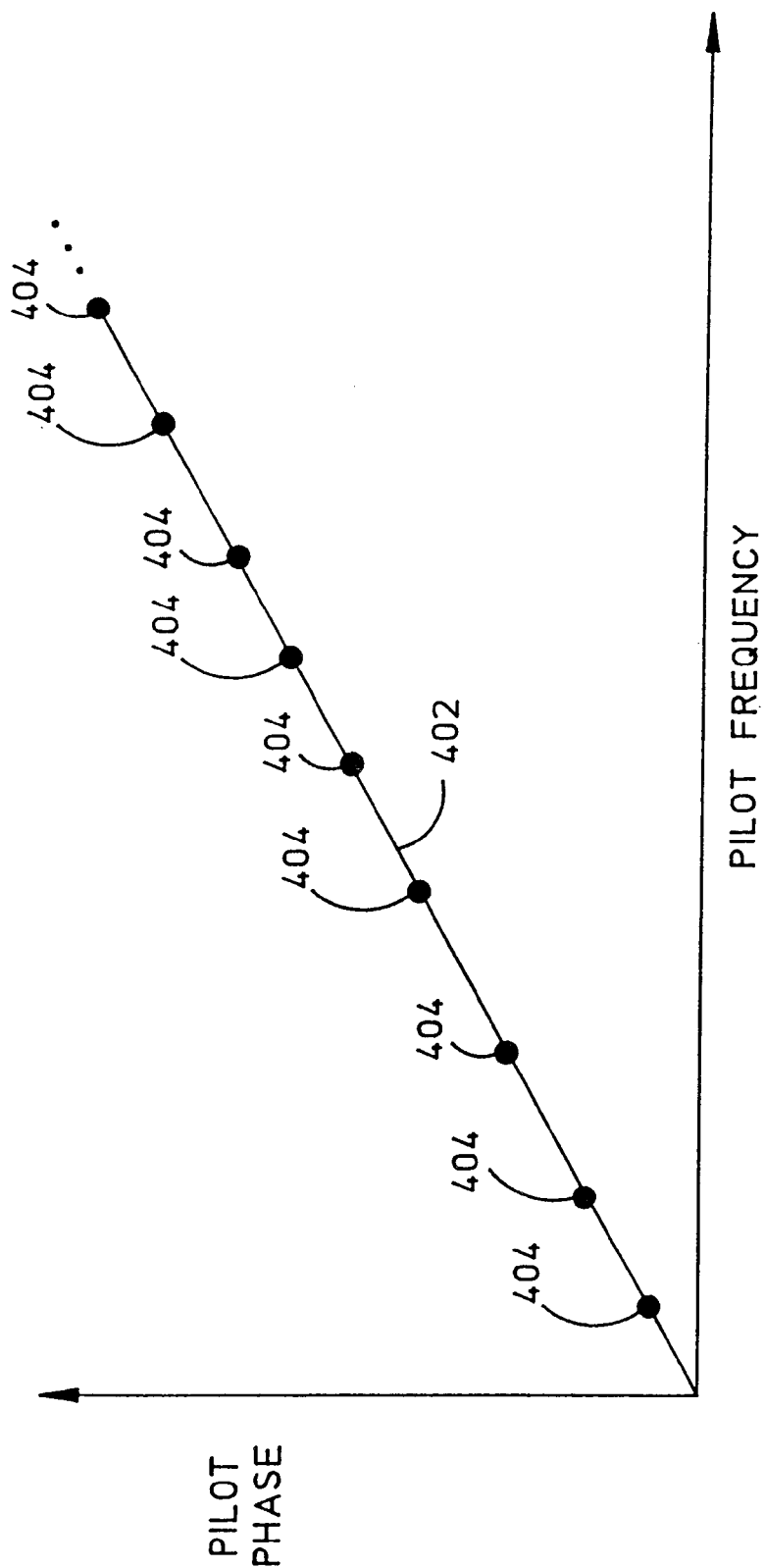
FIG. 4 is a graphical representation of relationship between the pilot frequency and the pilot phase in accordance with the exemplary embodiment of the invention.

FIG. 4 is a graphical representation of relationship between the pilot frequency and the pilot phase. When a frequency offset occurs between the transmitter 102 and the receiver 106, the i;near relationship between pilot frequencies and the pilot signal phases can be illustrated by the upward sloping line in FIG. 4. Bach data point 404 along the line 402 corresponds to a pilot signal (204, 205, 206). Since the multiple pilots signals 204, 205, 206 are spaced in frequency, a synchronization error results in different phase values for each pilot signal (204, 205, 206). The slope of the line 402 corresponds to the timing error 306.

Figure 5:
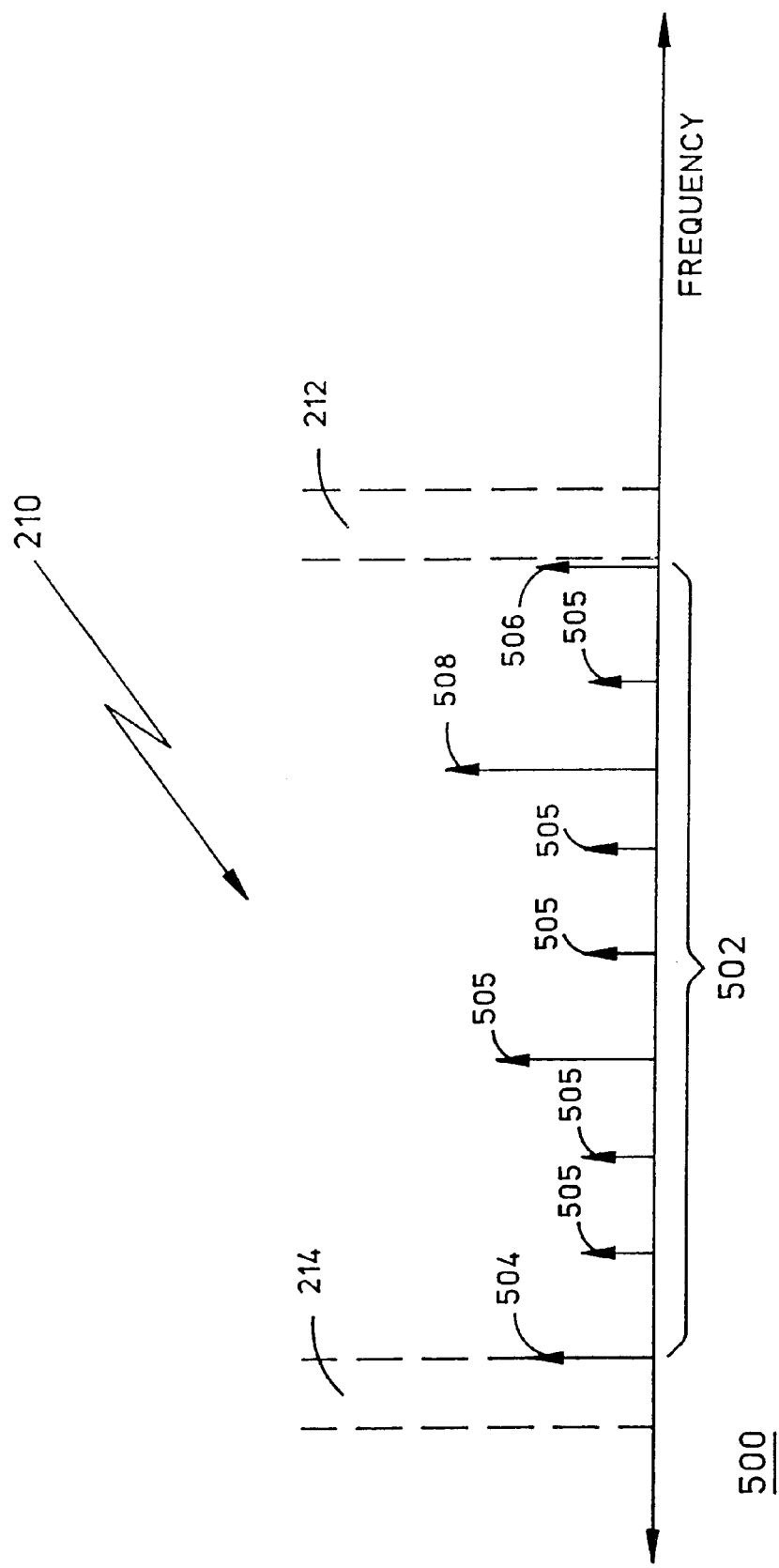
FIG. 5 is a graphical representation of the frequency spectrum as received by the receiver when the receiver and the transmitter are synchronized.

FIG. 5 is a graphical representation of the frequency spectrum 200 of received signals 502 corresponding to the transmitted signals 202 as received by the receiver 106 when the receiver 106 and the transmitter 102 are synchronized. In addition to the received data signals 508, the receiver 106 receives the lower pilot signal 504, the pilot signals 505 and the upper pilot signal 506. When the receiver 106 and the transmitter 102 are synchronized, the upper pilot signal 506 and the lower pilot signal 504 are received within the transmission band 210. If the energy within the lower guard band 214 is represented by L and the energy representing the energy within the upper guard 212 band is represented by U, the ratio of the energies (U/L) is approximately equal to one. Therefore, the contribution of the energies from each of the pilot signals 504, 506 within the adjacent guard band 214, 212 is approximately the same when the transmitter 102 and the receiver 106 are synchronized.

Figure 6:
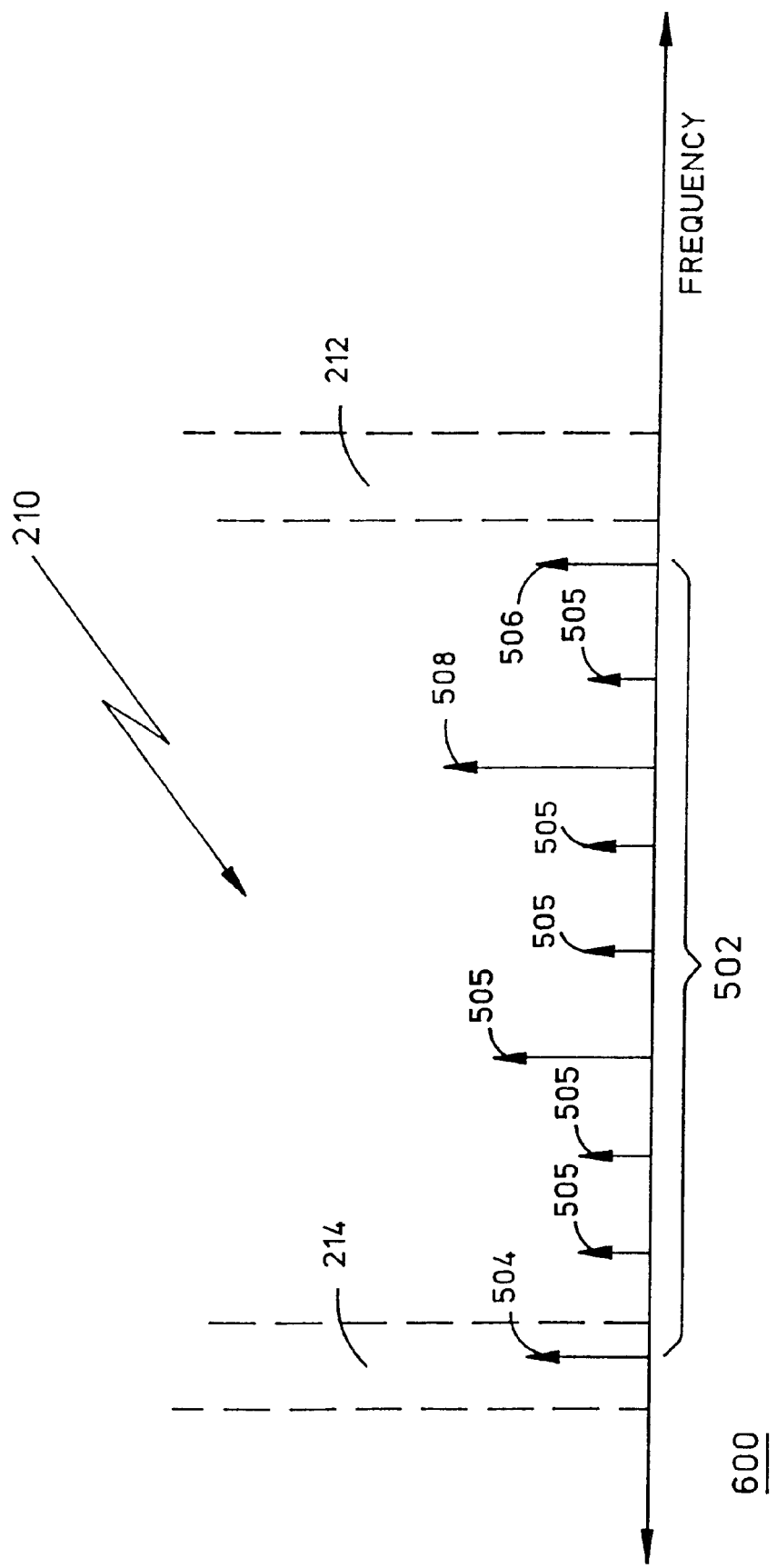
FIG. 6 is a graphical representation of the frequency spectrum when a synchronization error results in a negative frequency shift.

FIG. 6 is a graphical representation of the frequency spectrum 600 when a synchronization error results in a negative frequency shift of the received signals 502. The lower pilot signal 504 is received within the lower guard band 214 due to the frequency offset. Therefore, the energy detector 112 detects more energy in the lower guard band 214 than in the upper guard band 212, resulting in an energy ratio (U/L) less than one. If the energy ratio falls below a lower predetermined threshold, the controller 10 indicates that an out-of-synchronization status has occurred.

Figure 7:
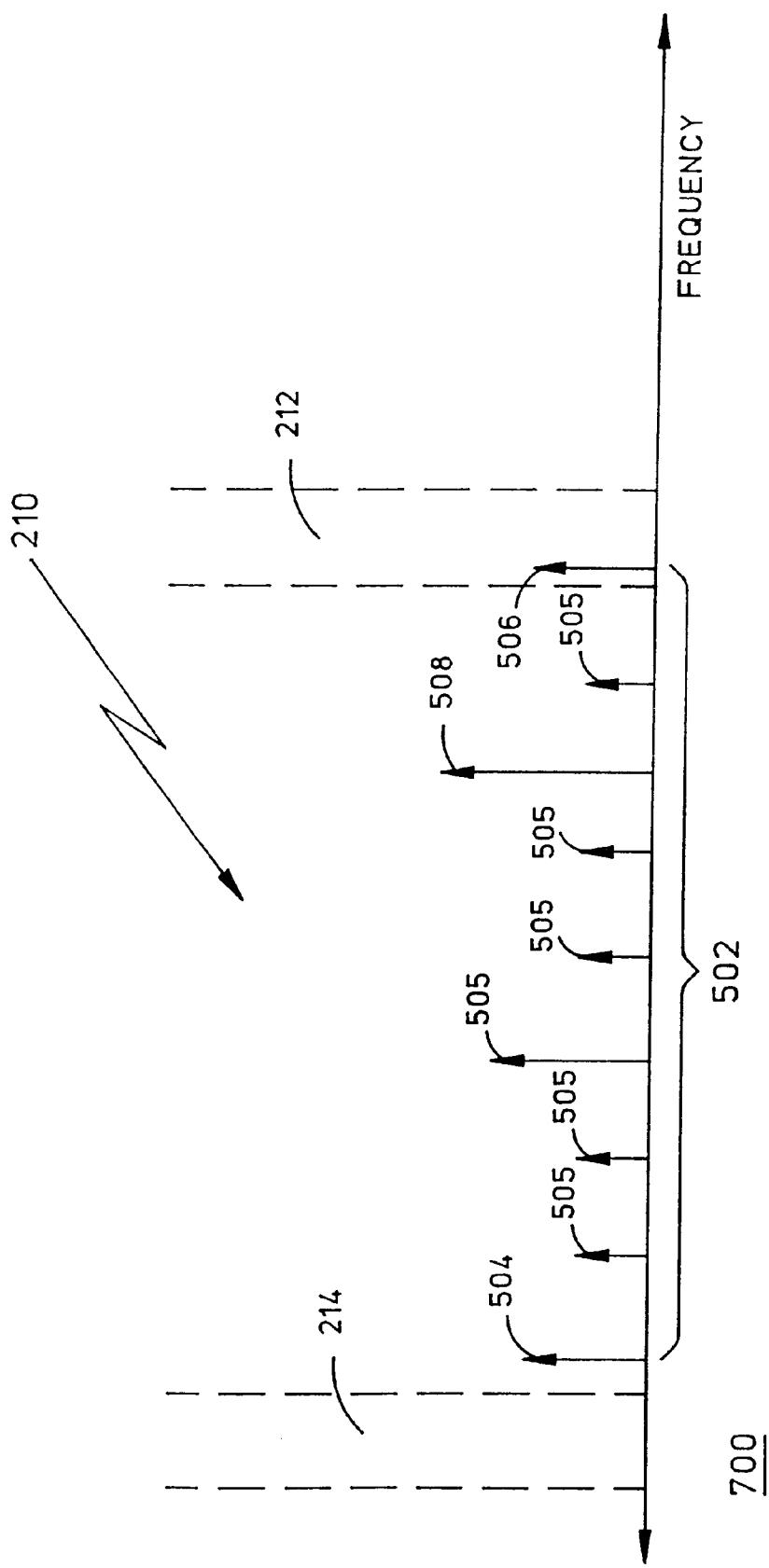
FIG. 7 is a graphical representation of the frequency spectrum when a synchronization error results in a positive frequency shift.

FIG. 7 is a graphical representation of the frequency spectrum 700 when a synchronization error results in a positive frequency shift of the received signals 502. The upper pilot signal 506 is received within the upper guard band 212 due to the frequency offset. Therefore, the energy detector 112 detects more energy in the upper guard band 212 than in the lower guard band 214, resulting in an energy ratio (U/L) greater than one. If the energy ratio rises above a upper predetermined threshold, the controller 110 indicates that an out-of-synchronization status has occurred and the synchronization procedure is performed.

Figure 8:
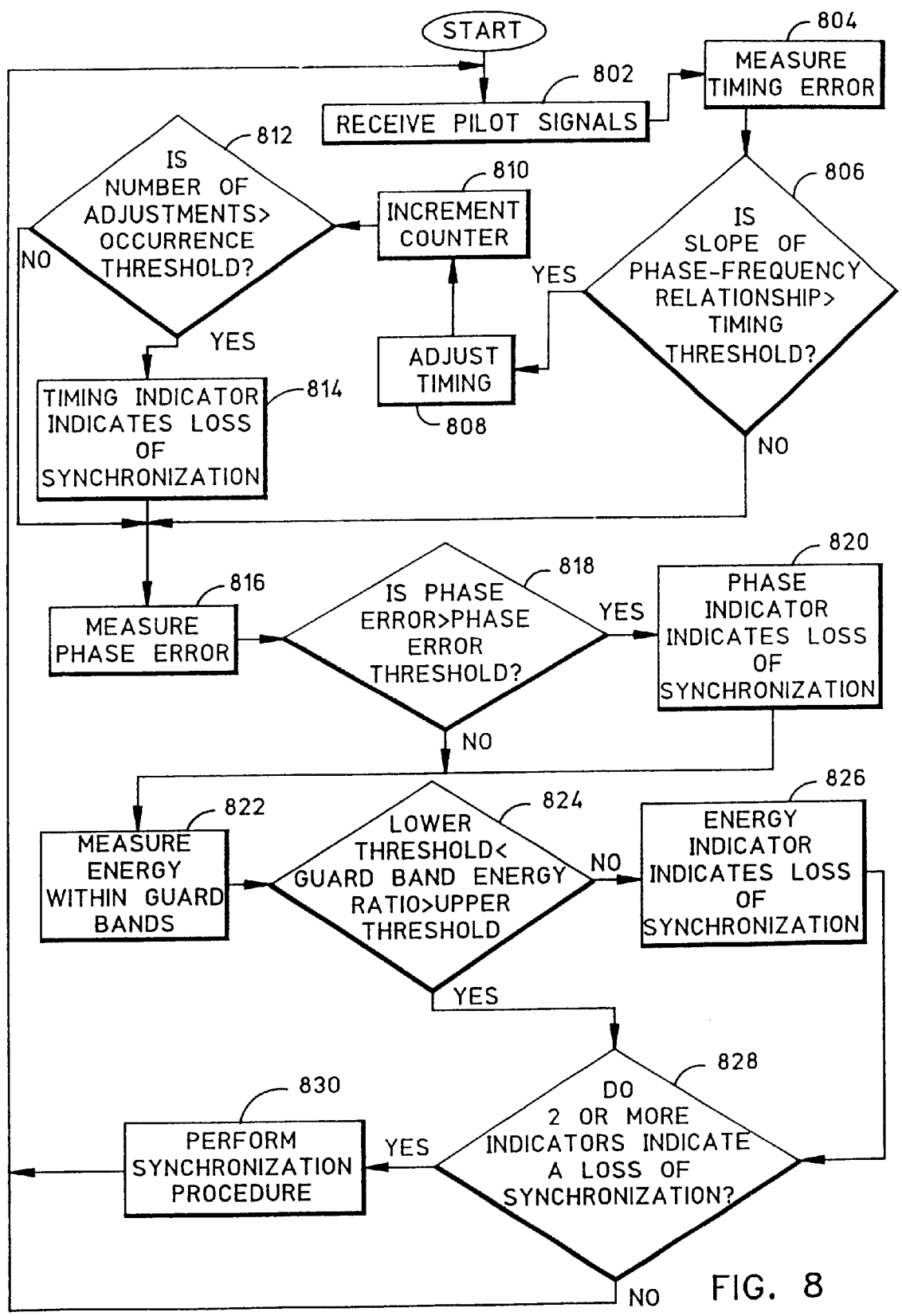
FIG. 8 is flow chart of method of detecting a loss of synchronization in accordance with the exemplary embodiment of the invention.

FIG. 8 is a flow chart of a method of detecting a loss of synchronization in accordance with the exemplary embodiment of the invention. As described above, the exemplary embodiment utilizes three synchronization indicators to determine that a loss of synchronization between the transmitter 102 and the receiver 106 has occurred. A voting scheme is used to determine whether the receiver 106 is synchronized to the transmitter 102. If a majority of the synchronization indicators provide a loss of synchronization indication, the receiver 106 is determined to be out of synchronization with the transmitter 102. In other embodiments, each of the indicators discussed may be used independently or with other types of synchronization indicators in other arrangements and combinations. Further, the information from each indicator may be analyzed and combined in different ways and orders to determine whether a loss of synchronization situation has occurred.

At step 802, the receiver 102 receives the transmitted spectrum 200 including a plurality of pilot signals (204–208). In the exemplary embodiment, eight pilot signals 204, 205, 206 are transmitted in addition to data signals 208.

At step 804, a waveform timing error is measured by observing the phase to frequency relationship of the plurality of pilot signals 204–206 transmitted from the transmitter 102. At least two pilot signals (204–206) are used for computing a phase ramp slope (phase-frequency relationship); and in the exemplary embodiment, the eight pilot signals 204–206 are transmitted and received for computing the phase ramp slope of a line defining the relationship between the frequency and phase of the pilot signals. As described above, the linear relationship between phase and frequency may be calculated from measured data using well-known curve fitting techniques and linear regression algorithms.

At step 806, it is determined whether the phase ramp slope is greater than a timing threshold. If the slope exceeds a given timing threshold, the timing of the receiver 106 is adjusted in accordance with the timing offset at step 808 and a counter is incremented in step 810. If the slope does not exceed the timing threshold, the procedure continues at step 816.

At step 812 the number of timing adjustments performed in a specified time period is compared to an occurrence threshold. Since a timing adjustment is made when the phase ramp slope exceeds the timing threshold, the number of timing adjustments is the same as the number of times the slope of the phase frequency relationship exceeds the timing threshold. If the counter value exceeds the occurrence threshold within a specified time period in step 812, the phase-frequency synchronization detector 120 indicates a loss of synchronization at step 814. Otherwise, the procedure continues at step 816.

At step 816, the receiver 106 measures a phase difference between the current and previous instance of at least one pilot signal (202–206) received from the transmitter 102.

At step 818, the phase error is compared to a phase error threshold to determine if, according to the phase detector 116, the receiver 106 has lost synchronization. If the phase error is greater than the phase error threshold, the phase detector 116 indicates that a loss of synchronization has occurred at step 820. Otherwise, the receiver 106 determines that the phase detector 116 indicates that the receiver 106 is synchronized with the transmitter 102 and the procedure continues at step 822.

At step 822, the energy within each of the guard bands (212, 214) is measured. As described above, the energy detector 112 sums the squares of the I and Q components of the signals contained within the frequency bandwidth associated with each guard band (212, 214) to determine the energy contained within the guard bands (212, 214).

At step 824, the ratio of the upper guard band 212 to the lower guard band 214 (guard band energy ratio) is compared to a range. If the guard band energy ratio is within the range, the energy guard band synchronization detector indicates that the receiver 106 is synchronized to transmitter 102. If the guard band energy ratio is outside the range, the procedure continues to step 826 where it is determined that the energy guard band indicator indicates a loss of synchronization. If the guard band energy ratio is within the range, the procedure continues at step, 828.

At step 828, it is determined whether the synchronization indicators collectively indicate a loss of synchronization. In the exemplary embodiment it is determined whether two or more indicators indicate that a loss of synchronization has occurred. Those skilled in the art will recognize the various other arrangements and techniques for implementing step 828. For example, a scheme may be used where only a unanimous indication of a loss of synchronization by the synchronization indicators denotes loss of synchronization.

If a loss of synchronization has occurred, the procedure continues to step 830 where a resynchronization is performed. As described above, any one of several techniques may be used to synchronize the receiver 106 to the transmitter 102. An example of a suitable method is described in co-pending U.S. patent application Ser. No. 09/594,866 filed on Jun. 14, 2000 and entitled "Methods And Apparatus For Use In Obtaining Frequency Synchronization In An OFDM Communication System". After performing the synchronization, or if no synchronization is required, the procedure returns to step 802.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

What is claimed is:

1. A method of determining a loss of synchronization between a receiver and a transmitter, the method comprising:

measuring an energy level of a pilot signal within a frequency guard band, the pilot signal transmitted adjacent to the frequency guard band; and detecting a loss of synchronization between a transmitter transmitting the pilot signal and a receiver in accordance with the energy level.

2. A method in accordance with claim 1, further comprising:

determining loss of synchronization if the energy level within the guard band is above a threshold.

3. A method in accordance with claim 1, further comprising:

measuring another energy level of another pilot signal within another frequency guard band, the another pilot signal transmitted adjacent to the another frequency guard band, wherein detecting loss of synchronization comprises comparing a threshold to a ratio of the energy level to the another energy level.

4. A method in accordance with claim 3, wherein comparing the ratio comprises:

detecting loss of synchronization if the ratio is greater than a threshold.

5. A method in accordance with claim 3, wherein comparing the ratio comprises:
   detecting loss of synchronization if the ratio is less than a threshold.

6. A method in accordance with claim 3, wherein comparing the ratio comprises:
   detecting loss of synchronization if the ratio is outside a range.

7. A method in accordance with claim 1, further comprising:
   detecting a loss of synchronization based on a timing error measured by a phase detector; and
   determining loss of synchronization if the energy within the guard band is above an energy threshold and the timing error is larger than a timing threshold.

8. A method in accordance with claim 7, wherein the detecting the loss of synchronization based on the timing error comprises:
   measuring a timing error of a received time slot within a series of received time slots.

9. A method in accordance with claim 1, further comprising:
   detecting a loss of synchronization based on a slope of a line defined by a relationship between a frequency and a phase of a plurality of pilot signals; and
   determining loss of synchronization if the energy within the guard band is above an energy threshold and the slope is greater than a timing threshold.

10. A method in accordance with claim 9, wherein detecting loss of synchronization comprises detecting loss of synchronization based on a number of slope threshold-exceeding occurrences within a time period.

11. A method of detecting a loss of synchronization between a transmitter and a receiver comprising:
    measuring a first energy within a first guard band, wherein a first pilot signal is transmitted adjacent to the first guard band;
    measuring a second energy within a second guard band, wherein a second pilot signal is transmitted adjacent to the second guard band; and
    detecting a loss of synchronization between the transmitter and the receiver based on a ratio of the first energy to the second energy.

12. A method in accordance with claim 11, wherein detecting comprises:
    detecting loss of synchronization if the ratio exceeds a guard band energy threshold.

13. A method in accordance with claim 11, wherein detecting comprises:
    detecting loss of synchronization when the ratio is outside a range.

14. A method in accordance with claim 13, further comprising:
    detecting loss of synchronization based on a relationship between a phase to a frequency of a plurality of pilot tones.

15. A method of detecting a loss of synchronization between a transmitter and a receiver in a multiple-carrier communication system, the method comprising:
    measuring a phase-to-frequency relationship for a plurality of pilot tones received at the receiver from the transmitter;
    measuring a first energy within a first guard band, wherein a first pilot signal is transmitted adjacent to the first guard band;
    measuring a second energy within a second guard band, wherein a second pilot signal is transmitted adjacent to the second guard band; and
    detecting a loss of synchronization between the transmitter and the receiver based on a ratio of the first energy to the second energy and the phase-to-frequency relationship.

16. A guard band energy synchronization detector comprising:
    an energy detector adapted to measure an energy level of a pilot signal within a frequency guard band, the pilot signal transmitted adjacent to the frequency guard band; and
    a controller adapted to determine a loss of synchronization between a transmitter transmitting the pilot signal and a receiver in accordance with the energy level.

17. A guard band energy synchronization detector in accordance with claim 16, wherein the controller is further adapted to determine loss of synchronization if the energy level within the guard band is above a threshold.

18. A guard band energy synchronization detector in accordance with claim 16, wherein the energy detector is further adapted to measure another energy level of another pilot signal within another frequency guard band, the another pilot signal transmitted adjacent to the another frequency guard band, the controller further adapted to detect loss of synchronization by comparing a threshold to a ratio of the energy level to the another energy level.

19. A guard band energy synchronization detector in accordance with claim 18, wherein the controller is further adapted to compare the ratio by detecting loss of synchronization if the ratio is greater than a threshold.

20. A guard band energy synchronization detector in accordance with claim 18, wherein the controller is further adapted to compare the ratio by detecting loss of synchronization if the ratio is less than a threshold.

21. A guard band energy synchronization detector in accordance with claim 18, wherein the controller is further adapted to compare the ratio by detecting loss of synchronization if the ratio is outside a range.

22. A guard band energy synchronization detector in accordance with claim 16, further comprising:
    a phase-frequency slope synchronization detector configured to measure a timing error, the controller further adapted to determine loss of synchronization if the energy within the guard band is above an energy threshold and the timing error is larger than a timing threshold.

* * * * *